United States Patent
Ling

(12) 
(10) Patent No.: US 10,222,558 B2
(45) Date of Patent: Mar. 5, 2019

(54) FERRULE FOR OPTICAL FIBER CONNECTOR AND POSITIONING MOLD THEREOF

(71) Applicant: Kow-Je Ling, Taipei (TW)

(72) Inventor: Kow-Je Ling, Taipei (TW)

( * ) Notice: Subject to any disclaimer, the term of this patent is extended or adjusted under 35 U.S.C. 154(b) by 0 days.

(21) Appl. No.: 15/794,130

(22) Filed: Oct. 26, 2017

(65) Prior Publication Data

US 2018/0120514 A1    May 3, 2018

(30) Foreign Application Priority Data

Oct. 27, 2016   (TW) ............................. 105134802 A
Oct. 20, 2017   (TW) ............................. 106136015 A

(51) Int. Cl.
G02B 6/38          (2006.01)

(52) U.S. Cl.
CPC .......... *G02B 6/3842* (2013.01); *G02B 6/3861* (2013.01)

(58) Field of Classification Search
CPC .. G02B 6/3839; G02B 6/3842; G02B 6/3861; G02B 6/3862; G02B 6/3865; G02B 6/3847
See application file for complete search history.

(56) References Cited

U.S. PATENT DOCUMENTS

| | | | | |
|---|---|---|---|---|
| 5,016,972 A | * | 5/1991 | Schlaak | G02B 6/3636 385/65 |
| 5,602,951 A | * | 2/1997 | Shiota | G02B 6/3839 385/59 |
| 5,712,939 A | * | 1/1998 | Shahid | G02B 6/3822 385/78 |
| 5,867,620 A | * | 2/1999 | Bunin | G02B 6/3834 385/53 |

(Continued)

FOREIGN PATENT DOCUMENTS

| CN | 103597389 A | 2/2014 |
|---|---|---|
| CN | 103901544 A | 7/2014 |

(Continued)

*Primary Examiner* — Rhonda S Peace
(74) *Attorney, Agent, or Firm* — Bacon & Thomas, PLLC

(57) ABSTRACT

A ferrule for optical fiber connector includes a first body component, a second body component, and a third body component. The first body component includes at least one first mounting portion and two accommodation portions. The second body component is disposed above the first body component, and includes at least one second mounting portion, where the at least one second mounting portion corresponds to the at least one first mounting portion. The third body component is disposed above the first body component and the second body component, and includes at least one positioning through aperture and two second through apertures, where the two second through apertures correspond to the two accommodation portions, respectively. The first body component, the second body compo- (Continued)

nent, and the third body component are adhered integrally together, with adhesive. Also disclosed is a positioning mold for positioning the ferrule. By using the positioning mold, the ferrule for optical fiber connector can be assembled more easily, so as to improve the productivity in manufacturing optical fiber connectors.

14 Claims, 22 Drawing Sheets

(56) References Cited

U.S. PATENT DOCUMENTS

| | | | | |
|---|---|---|---|---|
| 5,963,691 | A * | 10/1999 | Bunin | G02B 6/3885 385/78 |
| 6,945,706 | B2 * | 9/2005 | Gimbel | G02B 6/3882 385/78 |
| 8,580,162 | B2 * | 11/2013 | Ott | B29D 11/0075 264/1.25 |
| 8,740,474 | B2 * | 6/2014 | Lu | B29D 11/0075 156/153 |
| 9,116,308 | B2 * | 8/2015 | Huang | G02B 6/3807 |
| 9,759,882 | B2 * | 9/2017 | Chen | G02B 6/4292 |
| 9,772,454 | B2 * | 9/2017 | Droesbeke | G02B 6/3839 |
| 2003/0016918 | A1 * | 1/2003 | Grabbe | G02B 6/245 385/78 |
| 2003/0026554 | A1 * | 2/2003 | Jin | G02B 6/4249 385/89 |
| 2011/0064357 | A1 * | 3/2011 | Chang | G02B 6/32 385/33 |
| 2015/0023634 | A1 * | 1/2015 | Huang | G02B 6/3839 385/77 |
| 2018/0120514 | A1 * | 5/2018 | Ling | G02B 6/3861 |
| 2018/0120521 | A1 * | 5/2018 | Ling | G02B 6/3887 |

FOREIGN PATENT DOCUMENTS

| | | | |
|---|---|---|---|
| TW | 201523051 A | 6/2015 | |
| WO | WO 03091779 A1 * | 11/2003 | G02B 6/3835 |

* cited by examiner

FERRULE FOR OPTICAL FIBER CONNECTOR AND POSITIONING MOLD THEREOF

CROSS REFERENCE TO RELATED APPLICATION

This application claims the benefits of the Taiwan Patent Application Serial Number 105134802, filed on Oct. 27, 2016, and the Taiwan Patent Application Serial Number 106136015, filed on Oct. 20, 2017, the subject matter of which is incorporated herein by reference.

BACKGROUND OF THE INVENTION

1. Field of the Invention

The present invention relates to a ferrule for optical fiber connector and a positioning mold of the ferrule, and more particularly, to a ferrule for optical fiber connector made in an assembly measure and the use of the positioning mold to position the ferrule employed in fiber connectors including bare fibers, and to a positioning mold for positioning the ferrule.

2. Description of Related Art

As the era is progressing, Internet technology has been developed and changed day after day. Various kinds of information transmitted and received through Internet have become an important source of intelligence. In particular, the Internet, with merits of its real-time characteristic, turns out to be one of the indispensable media for interpersonal relations and communications between politicians or between businesses.

Following a rapid growth of the amount of information, optical fiber cables have developed and played a role in connecting Internet facilities which serve as a medium of transmission. Along with popularization of Internet, optical fiber cables have been employed through government official services or huge organizations such as enterprises for business purposes, and down to personal usage.

No matter whether optical fiber cables are used by enterprises or personal, optical fiber connectors are essential to bond the optical fiber cables with relevant hardware facilities. In manufacturing the optical fiber connectors, normally molds are employed and with the measure of injection molding, the optical fiber connectors are accomplished. However, optical fiber lines, during positioning thereof, may fracture easily and that the remains are left in optical fiber positioning apertures, resulting in a lower yield rate and productivity for the production of optical fiber connectors.

Given the above, the ferrule for optical fiber connector and positioning mold thereof, according to the present invention, are innovatively conceived, and accomplished through persistent research and experiments, where a first body component, a second body component, and a third body component are employed in the ferrule for optical fiber connector, and by way of assembly, the manufacturing process can be simplified; let alone the structural design of the thin plates and the partitioning plate can help position the bare fiber, that fractured optical fiber lines can be taken out easily and productivity of optical fiber connectors can be improved.

SUMMARY OF THE INVENTION

To solve the problem given above, an object of the present invention is to provide a ferrule for optical fiber connector and positioning mold thereof so as to improve the productivity of optical fiber connectors.

To achieve the above-mentioned object, the ferrule for optical fiber connector, in a first aspect, comprises a first body component, a second body component, and a third body component. The first body component includes at least one first mounting portion and two accommodation portions. The second body component is disposed above the first body component, and includes at least one second mounting portion, where the at least one second mounting portion corresponds to the at least one first mounting portion, respectively. The third body component is disposed above the first body component and the second body component, and includes at least one positioning through aperture and two second through apertures, where the two second through apertures correspond to the two accommodation portions, respectively. The first body component, the second body component, and the third body component are adhered integrally together, with adhesive.

According to the present invention, the ferrule for optical fiber connector, in the first aspect, further comprises two tubular components disposed, respectively, in the two accommodation portions, where the two tubular components are adhered integrally together, with adhesive, the first body component, the second body component, and the third body component, and where the two tubular components each has a third through aperture corresponding to the second through aperture.

Further, according to the present invention, the ferrule for optical fiber connector, in the first aspect, further comprises an optical fiber assembly group interposed in between the at least one first mounting portion and the at least one second mounting portion.

Still further, according to the present invention, in the first aspect, the first body component and the second body component are each formed with two recessed portions, and that the third body component is formed with two protrusions corresponding to the two recessed portions, respectively.

According to the present invention, in the first aspect, the first body component and the second body component are each formed with two engaging recesses, and that the third body component is formed with two engaging portions corresponding to the two engaging recesses, respectively.

Further, according to the present invention, in the first aspect, the first body component further includes two engaging recesses, and that the second body component further includes two engaging portions corresponding to the two engaging recesses.

Still further, according to the present invention, in the first aspect, the first body component further includes two engaging recesses; that the second body component further includes two engaging portions corresponding to the two engaging recesses, respectively, and two buckling recesses; and that the third body component further includes two buckling portions corresponding to the two buckling recesses.

According to the present invention, the ferrule for optical fiber connector, in a second aspect, comprises a first body component, a second body component, and two tubular components. The first body component includes at least one first mounting portion and two accommodation portions. The second body component is disposed above the first body component, and includes at least one second mounting portion, where the at least one second mounting portion corresponds to the at least one first mounting portion. The two tubular components are received in the two accommodation portions, respectively, where the two tubular components each has a third through aperture for receiving a positioning pin. The first body component, the second body component, and the two tubular components are adhered integrally together, with adhesive.

Further, according to the present invention, the ferrule for optical fiber connector, in the second aspect, further comprises an optical fiber assembly group interposed in between the at least one first mounting portion and the at least one second mounting portion.

Still further, according to the present invention, the ferrule for optical fiber connector, in the second aspect, further comprises two washers, where the two washers are adhered integrally together, with adhesive, the first body component, the second body component, and the two tubular components.

According to the present invention, in the second aspect, a positioning mold of the ferrule for optical fiber connector comprises a lower mold board and at least one thin plate. The lower mold board includes at least one through aperture and two positioning pins. The at least one thin plate is disposed above the lower mold board, and each includes at least one fiber positioning aperture and two first pin holes, where the at least one fiber positioning aperture corresponds to the at least one through aperture. The two first pin holes correspond to the two positioning pins, respectively. The at least one thin plate is fixedly engaged with the lower mold board.

Further, according to the present invention, in the second aspect, the positioning mold of the ferrule for optical fiber connector further comprises two washers sleeved to the two positioning pins, and located above the at least one thin plate.

Still further, according to the present invention, in the second aspect, the positioning mold of the ferrule for optical fiber connector further comprises a partitioning plate, and that the at least one thin plate may be two thin plates, such that the partitioning plate is interposed in between the two thin plates.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1A:
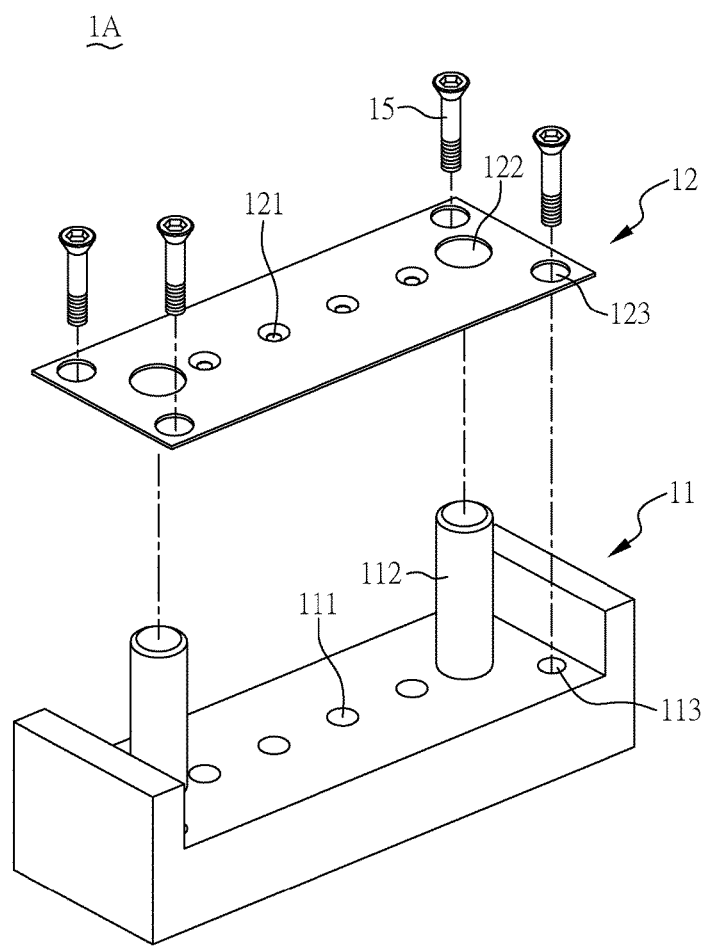
FIG. 1A is an exploded schematic view illustrating a first embodiment of the positioning mold of a ferrule for optical fiber connector according to the present invention.

According to the present invention, Referring to FIG. 1A, an exploded schematic view illustrating a first embodiment of the positioning mold of a ferrule for optical fiber connector according to the present invention, the positioning mold 1A comprises a lower mold board 11, a thin plate 12, and four fastening members 15. The lower mold board 11 includes four through apertures 111, two positioning pins 112, and four first fastening holes 113. The thin plate 12 is disposed above the lower mold board 11, and includes four fiber positioning apertures 121, two first pin holes 122 and four second fastening holes 123. The four fiber positioning apertures 121 correspond to the four through apertures 111, respectively; the two first pin holes 122 to the two positioning pins 112, respectively; the four fastening members 15 to the four second fastening holes 123 and the four first fastening holes 113, respectively, and then secured thereinto such that the thin plate 12 is fixedly engaged with the lower mold board 11. Through such structure, the four fiber positioning apertures 121 of the thin plate 12 can increase the positioning effect of the bare fiber.

Figure 1B:
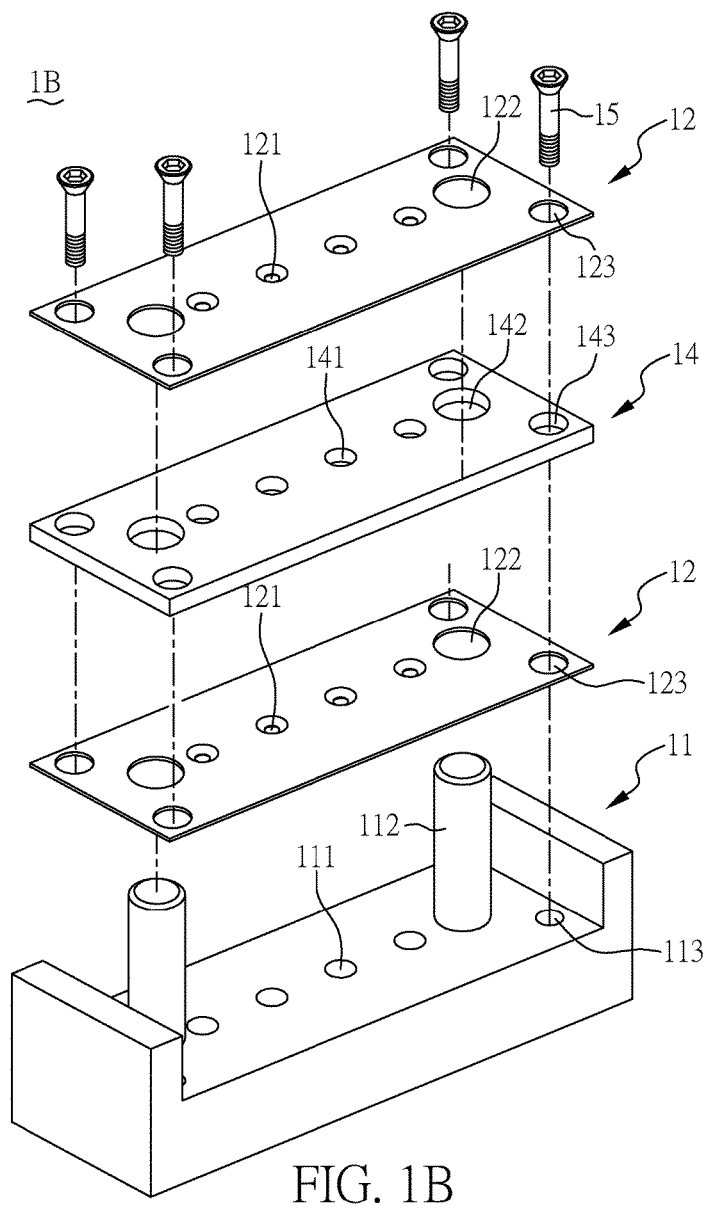
FIG. 1B is an exploded schematic view illustrating a second embodiment of the positioning mold of a ferrule for optical fiber connector according to the present invention.

Further, referring to FIG. 1B, an exploded schematic view illustrating a second embodiment of the positioning mold of a ferrule for optical fiber connector according to the present invention, the positioning mold 1B comprises a lower mold board 11, two thin plates 12, a partitioning plate 14, and four fastening members 15. The lower mold board 11 includes four through apertures 111, two positioning pins 112, and four first fastening holes 113. The partitioning plate 14 is interposed between the two thin plates 12, where the two thin plates 12 are disposed above the lower mold board 11, and each includes four fiber positioning apertures 121, two first pin holes 122 and four second fastening holes 123. The four fiber positioning holes 121 of each thin plate 12 correspond to the four through apertures 111, respectively; and the two first pin holes 122 to the two positioning pins 112, respectively. The portioning plate 14 includes four partitioning through holes 141, two partitioning pin holes 142, and four third fastening holes 143. The four partitioning through holes 141 correspond to the four fiber positioning holes 121 of each thin plate 12, respectively. The four fastening members 15 correspond to the four first fastening holes 113, the four second fastening holes 123 of each thin plate 12, and the four third fastening holes 143, respectively, and then secured thereinto such that the two thin plates 12 and the partitioning plate 14 are fixedly engaged with the lower mold board 11. Through such structure, the two thin plates 12 can increase the positioning effect of the bare fiber.

Figure 1C:
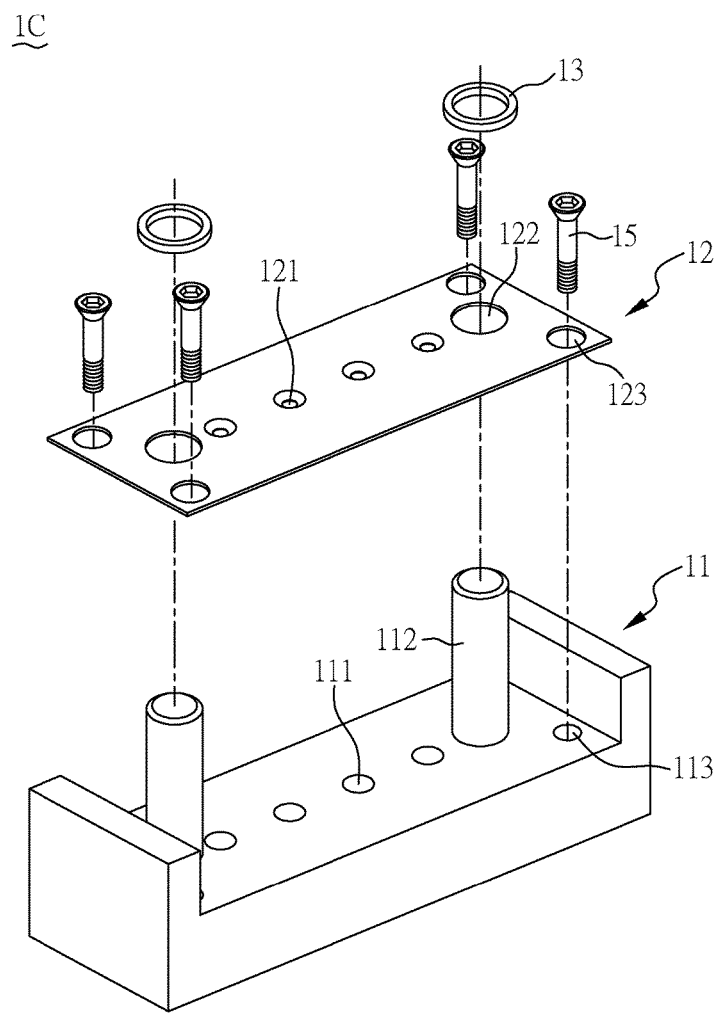
FIG. 1C is an exploded schematic view illustrating a third embodiment of the positioning mold of a ferrule for optical fiber connector according to the present invention.

Now referring to FIG. 1C, an exploded schematic view illustrating a third embodiment of the positioning mold of a ferrule for optical fiber connector according to the present invention, the positioning mold C comprises a lower mold board 11, a thin plate 12, two washers 13, and four fastening members 15. The lower mold board 11 includes four through apertures 111, two positioning pins 112, and four first fastening holes 113. The thin plate 12 is disposed above the lower mold board 11, and includes four fiber positioning apertures 121, two first pin holes 122 and four second fastening holes 123. The four fiber positioning apertures 121 correspond to the four through apertures 111, respectively; the two first pin holes 122 to the two positioning pins 112, respectively. The two washers 13 are sleeved to two positioning pins 112, respectively, and are engaged with the lower mold board 11 or with the ferrule for optical fiber connector as described later. The four fastening members 15 correspond to the four first fastening holes 113, and to the four second fastening holes 123, and secure thereto, respectively, such that the thin plate 12 is fixedly engaged with the lower mold board 11. Through such structure, the four fiber positioning apertures 121 of the thin plate 12 can increase the positioning effect of the bare fiber.

Alternatively, the thin plates 12 and the partitioning plate 14 of the positioning mold 1B can be made integrally as a unitary structure. When the thin plates 12 and the partitioning plate 14 are still in a state of plastic material, a plastic setting method is first applied to finish a dimension approximate to the specification, thereafter a laser cutting method is employed to accomplish a dimension practically required. Therefore, it is apparent that this also achieves an effect similar to that of the positioning mold achieved by the present invention.

Further, references are made to 2A, an exploded schematic view illustrating a first embodiment of the ferrule for optical fiber connector, together with its positioning mold, according to the present invention; FIG. 2B, an exploded schematic view illustrating a second embodiment of the ferrule for optical fiber connector, together with its positioning mold, according to the present invention; FIG. 2C, an exploded schematic view illustrating a third embodiment of the ferrule for optical fiber connector, together with its positioning mold, according to the present invention; FIG. 2D, a cross-sectional schematic view illustrating the third embodiment of the ferrule for optical fiber connector, together with its positioning mold, according to the present invention; and FIG. 2E, a schematic view illustrating an optical fiber connector made by the third embodiment of the ferrule for optical fiber connector, together with its positioning mold, according to the present invention.

Figure 2A:
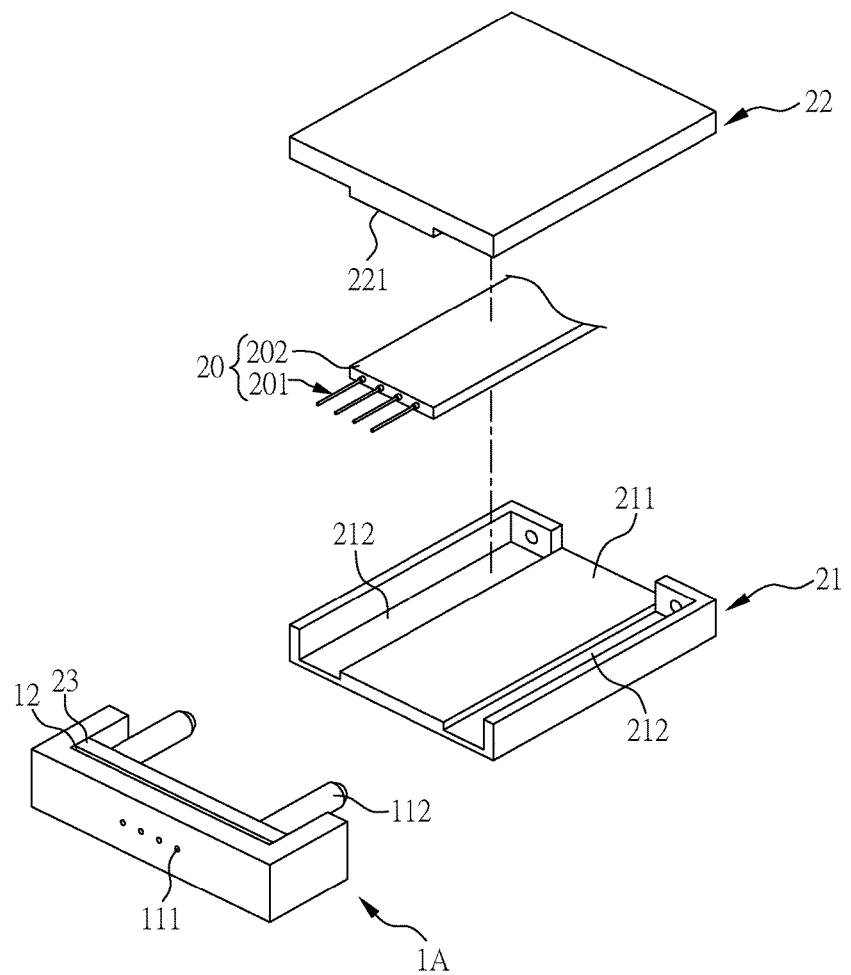
FIG. 2A is an exploded schematic view illustrating a first embodiment of the ferrule for optical fiber connector, together with its positioning mold, according to the present invention.
Figure 2B:
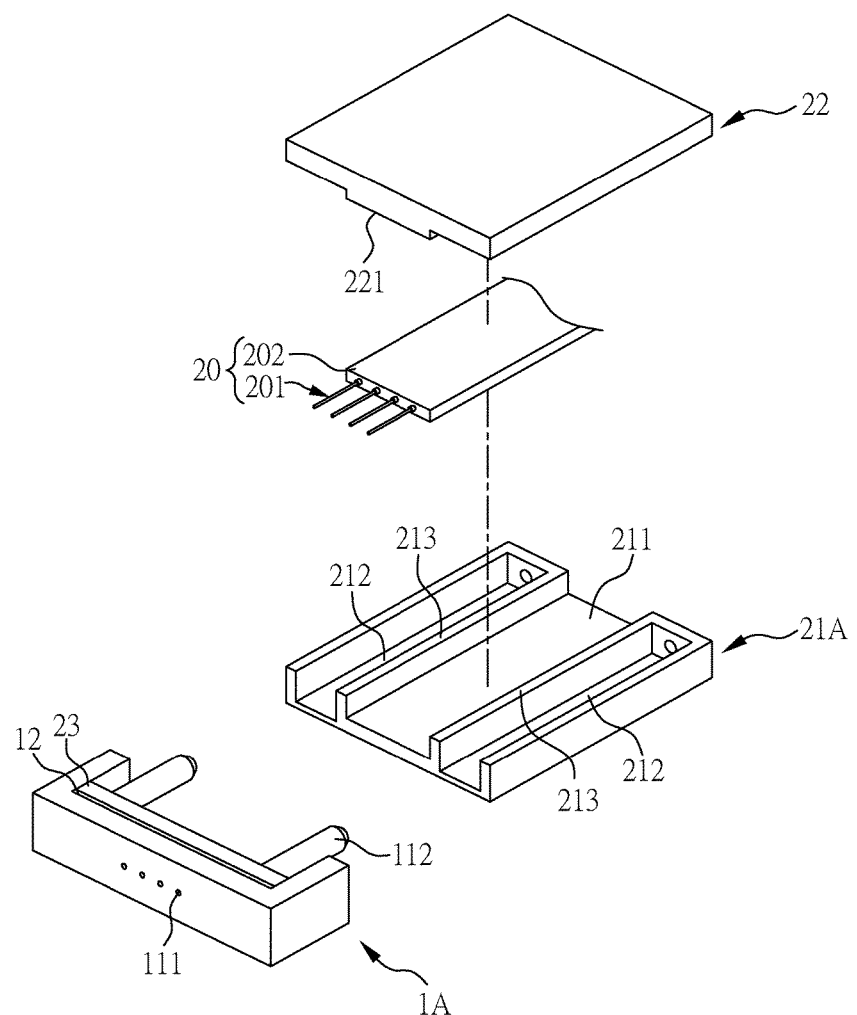
FIG. 2B is an exploded schematic view illustrating a second embodiment of the ferrule for optical fiber connector, together with its positioning mold, according to the present invention.
Figure 2C:
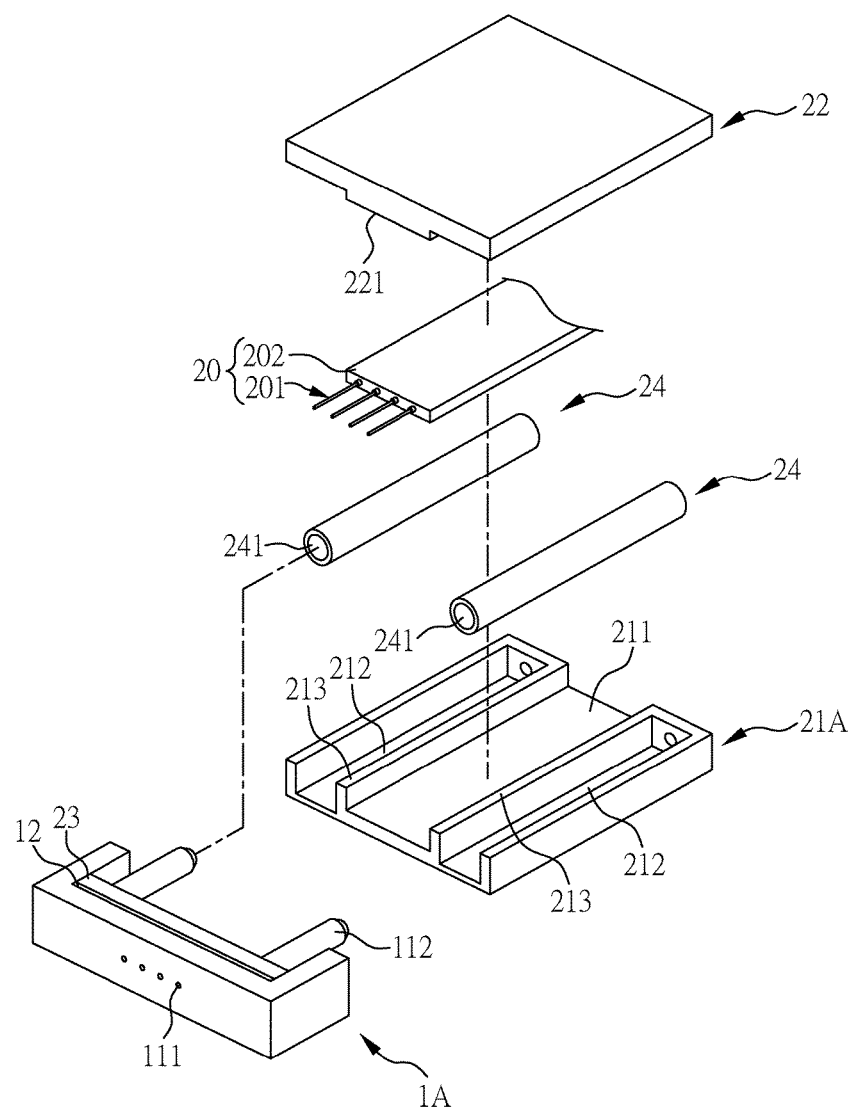
FIG. 2C is an exploded schematic view illustrating a third embodiment of the ferrule for optical fiber connector, together with its positioning mold, according to the present invention.
Figure 2D:
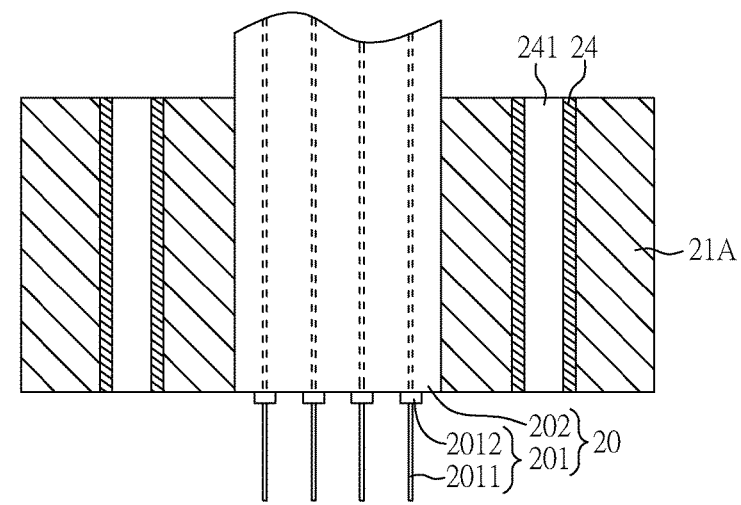
FIG. 2D is a cross-sectional schematic view illustrating the third embodiment of the ferrule for optical fiber connector, together with its positioning mold, according to the present invention.
Figure 2D:
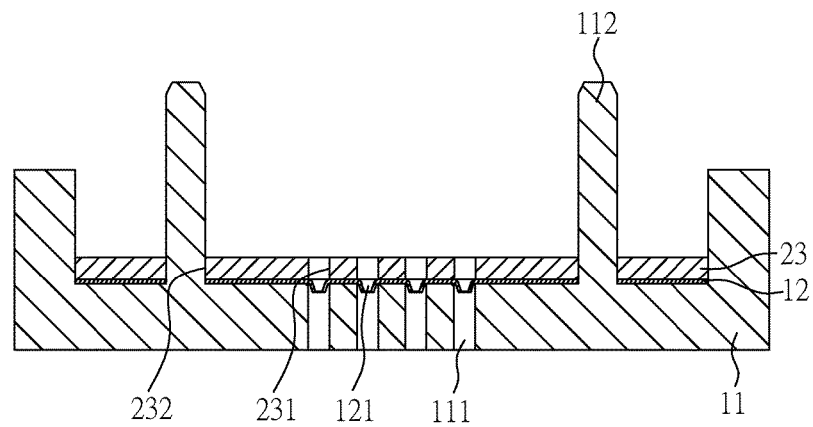

There are, as shown in FIG. 2A for the first embodiment of the ferrule for optical fiber connector together with its positioning mold, an optical fiber assembly group 20, a first body component 21, a second body component 22, a third body component 23, and a positioning mold 1A.

In the first embodiment of the ferrule, as also shown in FIG. 2B and FIG. 2C, the first body component 21 includes a first mounting portion 211 and two accommodation portions 212. The second body component 22 is disposed above the first body component 21, and includes a second mounting portion 221, where the second mounting portion 221 corresponds to the first mounting portion 211. The third body component 23 is disposed above the first body component 21 and the second body component 22, and includes four positioning through apertures 231 and two second through apertures 232 (see also FIG. 2D), where the second through apertures 232 correspond to the two accommodation portions 212, respectively.

In the first embodiment of the ferrule, the optical fiber assembly group 20, as shown in FIG. 2D, includes four optical fiber assemblies 201 and a first protective layer 202. The four optical fiber assemblies 201 each includes a bare fiber 2011 and a second protective layer 2012. The second protective layer 2012 wraps the bare fiber 2011 such that the bare fiber 2011 has its two ends emerged from the second protective layer 2012. Besides, the second protective layer 2012 emerges from the first protective layer 202, and is inserted into the positioning through aperture 231 of the third body component 23 for a positioning effect.

Further, the fiber positioning apertures 121 of the thin plate 12 of the positioning mold 1A, as shown in FIG. 2D, allow the bare fibers 2011 to have a more accurate positioning effect. In the first embodiment of the ferrule for optical fiber connector, the optical fiber connector is made by adhering integrally together, with adhesive, the optical fiber assembly group 20, the first body component 21, the second body component 22, and the third body component 23.

FIG. 2B shows a second embodiment of the ferrule for optical fiber connector, together with its positioning mold, where the second embodiment differs from the first embodiment in that a first body component 21A is formed with two mounting boards 213 for interposing therebetween the optical fiber assembly group 20. As such, when in the assembly of the ferrule for optical fiber connector for the second embodiment, reserving a mounting space for the optical fiber assembly group 20 is necessary, such that after combining integrally the second body component 22 and the third body component 23, the optical fiber assembly group 20 is inserted thereinto so as to accomplish an optical fiber connector.

FIG. 2C shows a third embodiment of the ferrule for optical fiber connector, together with its positioning mold; and that FIG. 2D shows the third embodiment of the ferrule for optical fiber connector, together with its positioning mold. The third embodiment differs from the second embodiment in that two tubular components 24 are disposed, respectively, in the two accommodation portions 212, where the two tubular components 24 each has a third through aperture 241 corresponding to the second through aperture 232. The two tubular components 24, as adhering integrally together, with adhesive, the first body component 21A, the second body component 22, and the third body component 23, and then interposing the optical fiber assembly group 20, an optical fiber connector can be formed. During a plug-in or plug-out action for the use of an optical fiber connector, the tubular components 24, as made of metallic material, can avoid any contaminated particles or fragments produced by friction and adversely effecting transmission of optical-fiber signals.

Figure 2E:
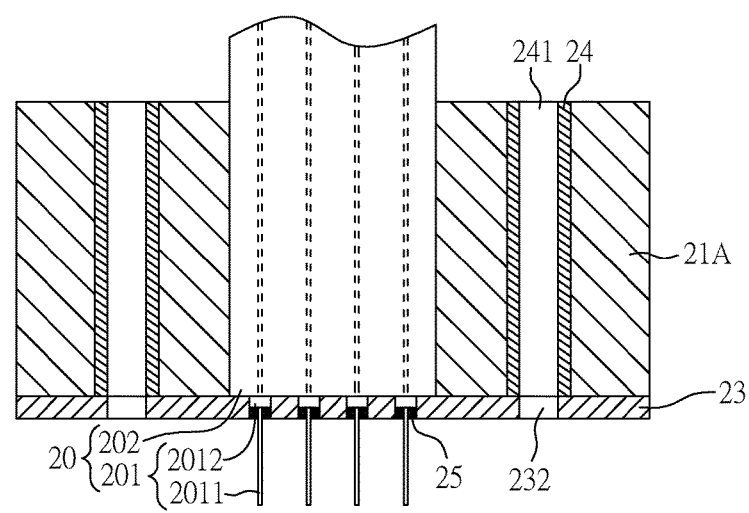
FIG. 2E is a schematic view illustrating an optical fiber connector made by the third embodiment of the ferrule for optical fiber connector, together with its positioning mold, according to the present invention.

FIG. 2E shows an optical fiber connector made by the third embodiment of the ferrule for optical fiber connector, together with its positioning mold. The second protective layer 2012 is inserted into, and positioned in, the positioning through aperture 231. However, the second protective layer 2012 merely takes part of the space of the positioning through aperture 231, and therefore, a plastic portion 25, formed by injecting therein plastic material, is required for securing the bare fiber 2011.

Figure 3A:
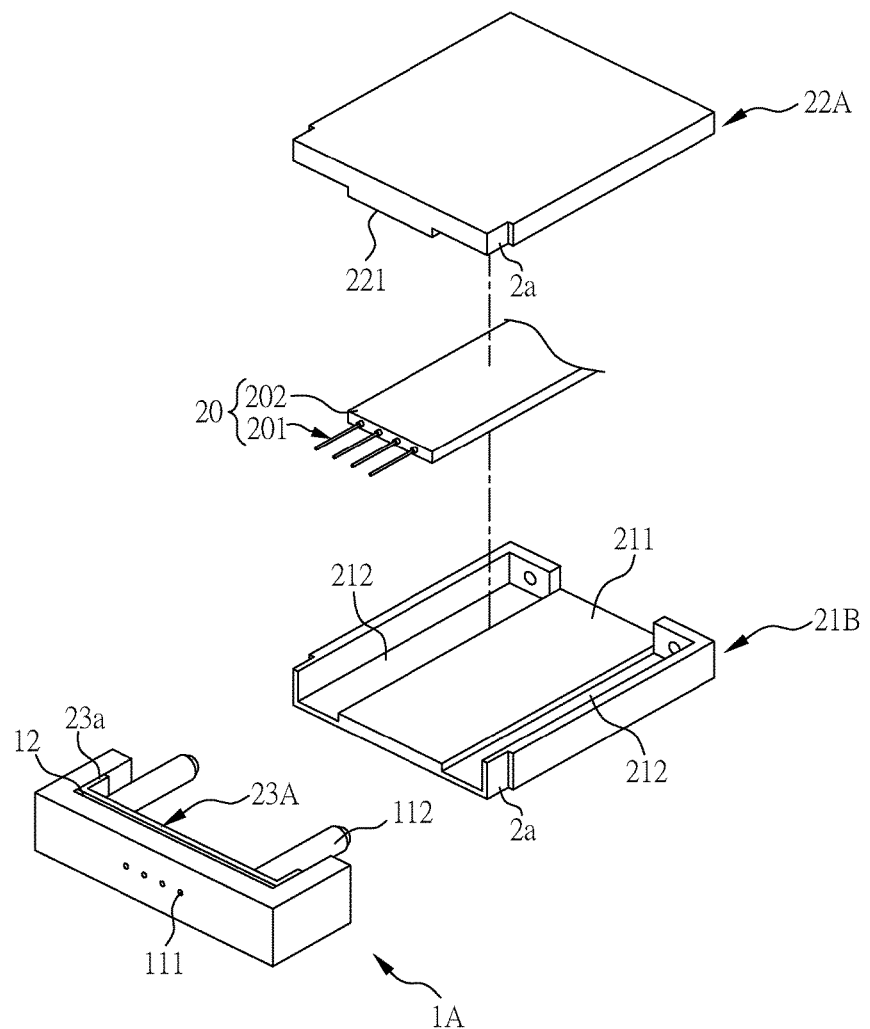
FIG. 3A is an exploded schematic view illustrating a fourth embodiment of the ferrule for optical fiber connector, together with its positioning mold, according to the present invention.
Figure 3B:
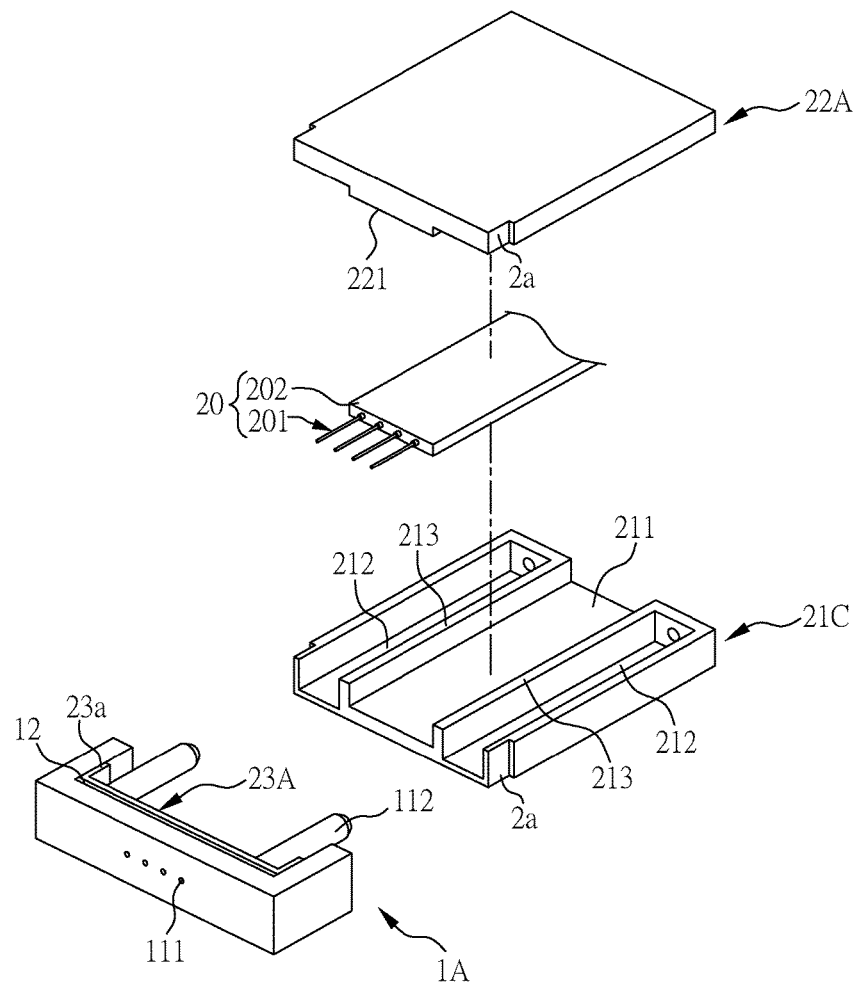
FIG. 3B is an exploded schematic view illustrating a fifth embodiment of the ferrule for optical fiber connector, together with its positioning mold, according to the present invention.

Now references are made to FIG. 3A, an exploded schematic view illustrating a fourth embodiment of the ferrule for optical fiber connector, together with its positioning mold, according to the present invention; FIG. 3B, an exploded schematic view illustrating a fifth embodiment of the ferrule for optical fiber connector, together with its positioning mold, according to the present invention; and FIG. 3C, an exploded schematic view illustrating a sixth embodiment of the ferrule for optical fiber connector, together with its positioning mold, according to the present invention.

The fourth embodiment of the ferrule for optical fiber connector, together with its positioning mold, is similar to those of the first embodiment in terms of structure; the fifth embodiment of the ferrule for optical fiber connector, together with its positioning mold, is similar to those of the second embodiment in terms of structure; and the sixth embodiment of the ferrule for optical fiber connector, together with its positioning mold, is similar to those of the second embodiment in terms of structure. In other words, FIG. 3A to FIG. 3C correspond to FIG. 2A to FIG. 2C, and as such, descriptions are necessary only for differences among them.

Figure 3C:
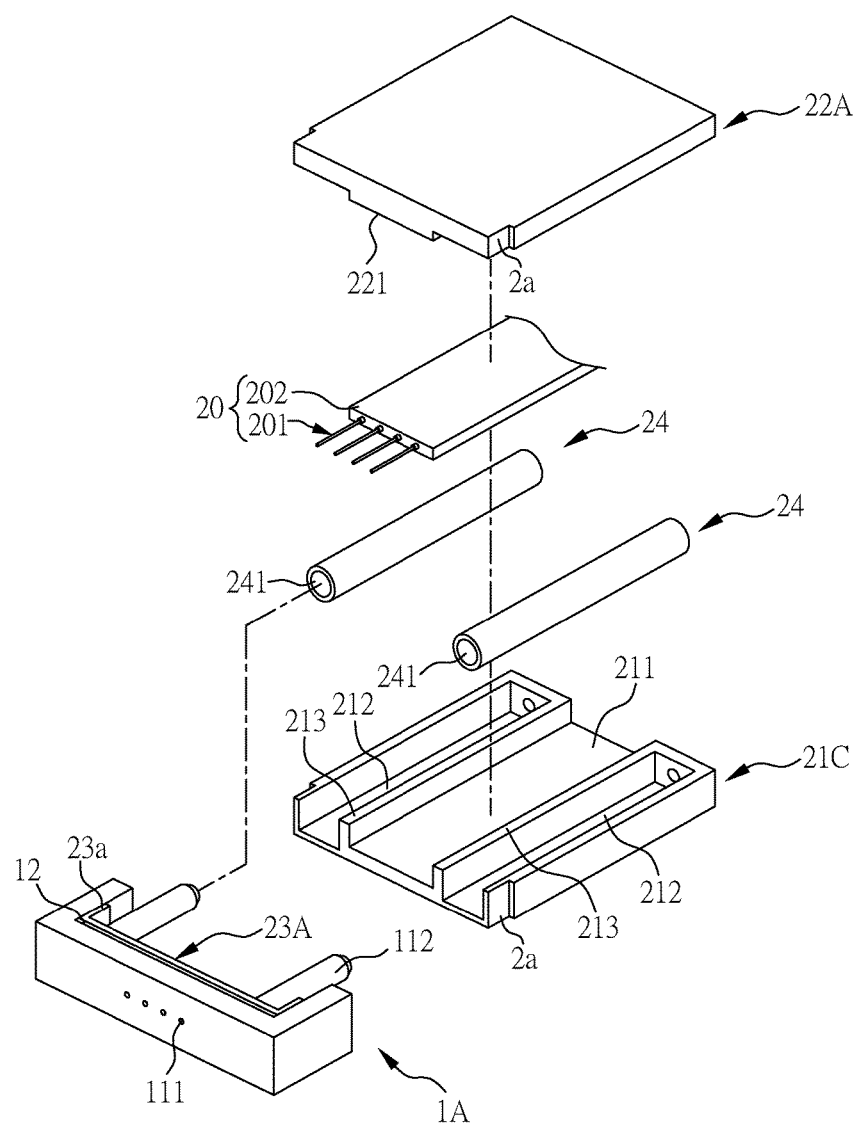
FIG. 3C is an exploded schematic view illustrating a sixth embodiment of the ferrule for optical fiber connector, together with its positioning mold, according to the present invention.

As shown in FIG. 3A to FIG. 3C, first body components 21B, 21C and a second body component 22A are each formed with two recessed portions 2a, and that a third body component 23A is formed with two protrusions 23a corresponding to the two recessed portions 2a, respectively. Therefore, by adhering, with adhesive, the first body components 21B, 21C, the second body component 22A, and the third body component 23A together as a unit, the two recessed portions 2a and the two protrusions 23a reinforce the engagement of the first body components 21B, 21C, the second body component 22A, and the third body component 23A.

Figure 4A:
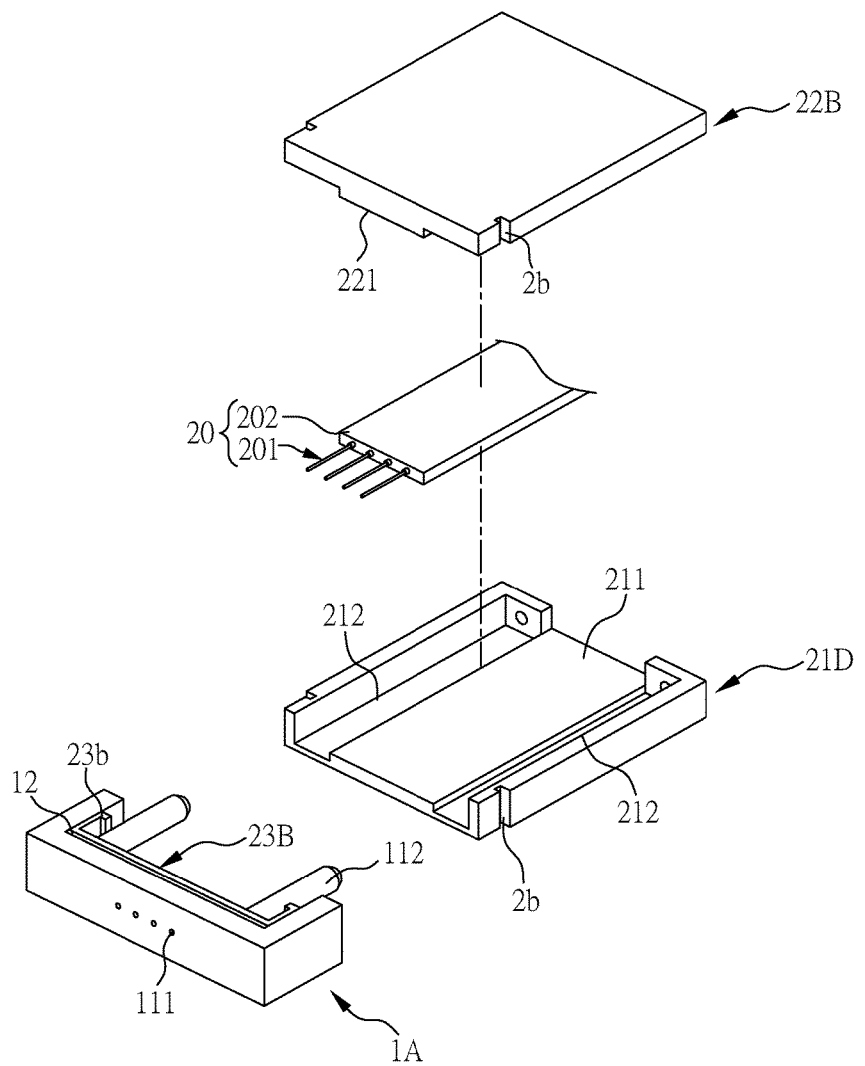
FIG. 4A is an exploded schematic view illustrating a seventh embodiment of the ferrule for optical fiber connector, together with its positioning mold, according to the present invention.
Figure 4B:
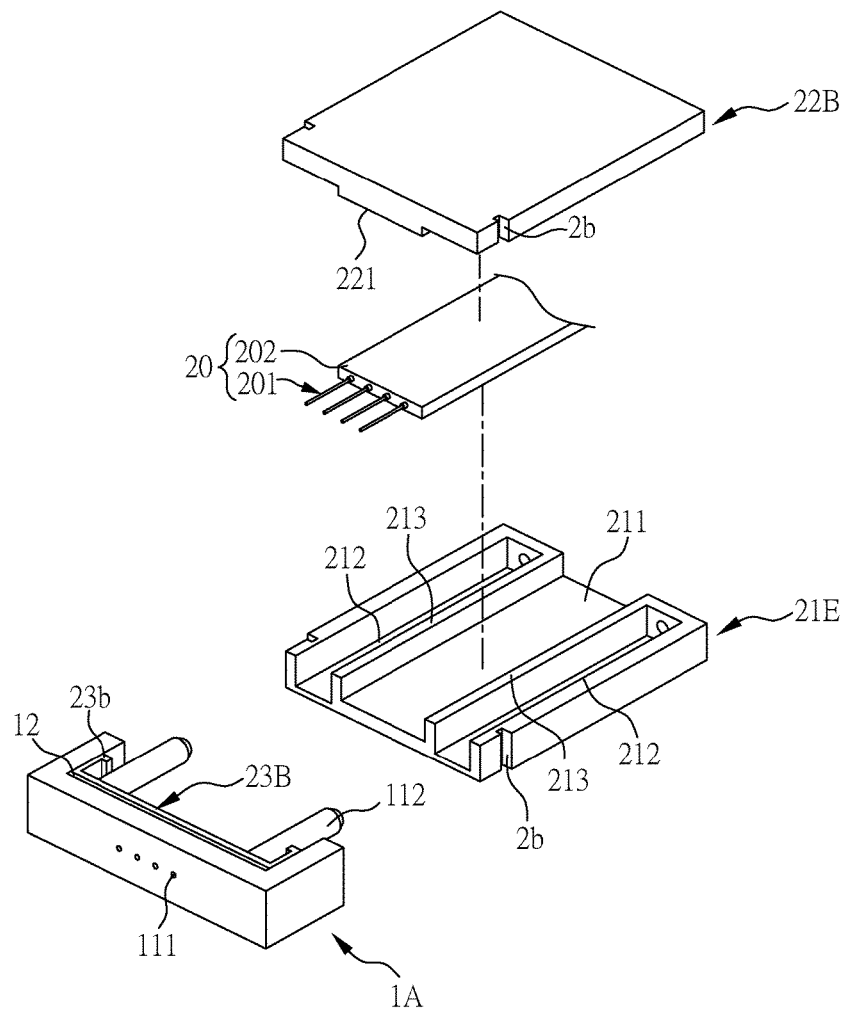
FIG. 4B is an exploded schematic view illustrating an eighth embodiment of the ferrule for optical fiber connector, together with its positioning mold, according to the present invention.

Further, references are made to FIG. 4A, an exploded schematic view illustrating a seventh embodiment of the ferrule for optical fiber connector, together with its positioning mold, according to the present invention; FIG. 4B, an exploded schematic view illustrating an eighth embodiment of the ferrule for optical fiber connector, together with its positioning mold, according to the present invention; and FIG. 4C, an exploded schematic view illustrating a ninth embodiment of the ferrule for optical fiber connector, together with its positioning mold, according to the present invention.

Figure 4C:
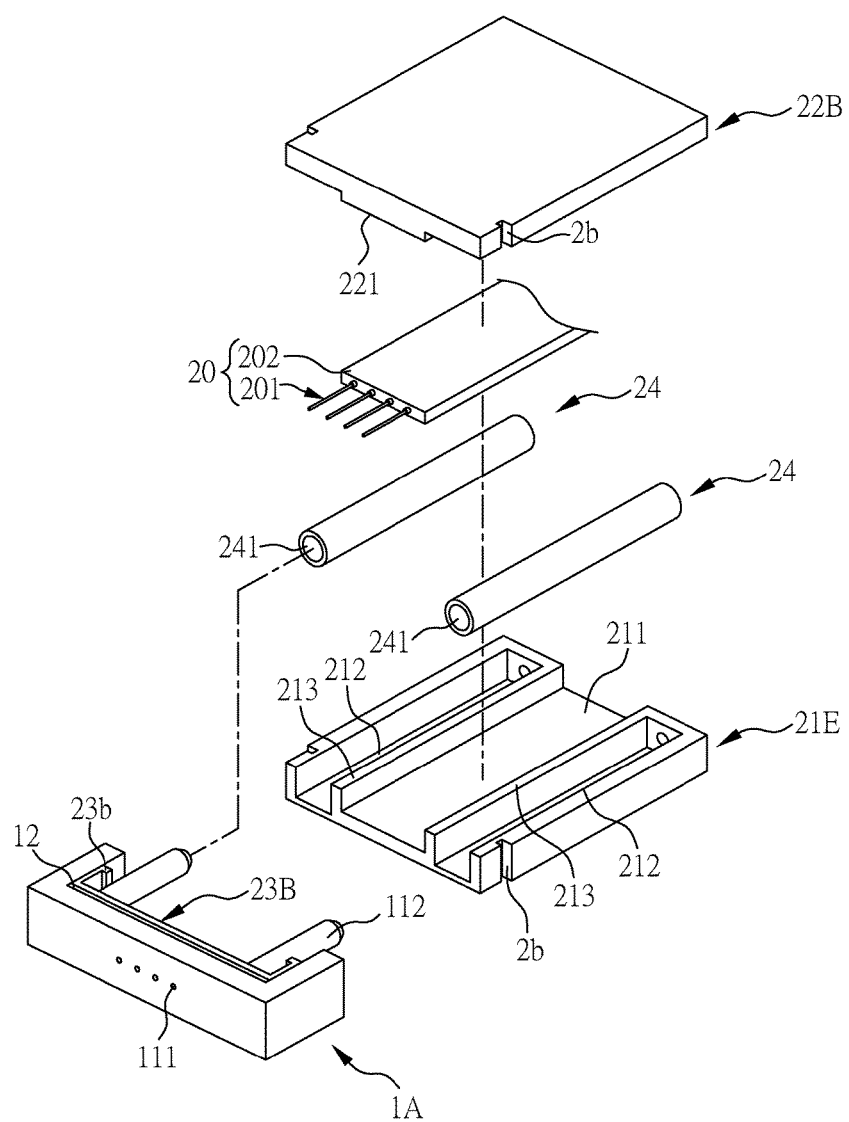
FIG. 4C is an exploded schematic view illustrating a ninth embodiment of the ferrule for optical fiber connector, together with its positioning mold, according to the present invention.

In view of the fact that FIG. 4A to FIG. 4C correspond to FIG. 2A to FIG. 2C, respectively, descriptions to similar structures therebetween will be omitted, whereas only different structures for FIG. 4A to FIG. 4C versus FIG. 2A to FIG. 2C, correspondingly, are described. As shown in FIG. 4A to FIG. 4C, first body components 21D, 21E and a second body component 22B are each formed with two engaging recesses 2b, and that a third body component 23B is formed with two engaging portions 23b corresponding to the two engaging recesses 2b, respectively. Therefore, by adhering, with adhesive, the first body components 21D, 21E, the second body component 22B, and the third body component 23B together as a unit, the two engaging recesses 2b and the two engaging portions 23a are engaged with other and such engagement reinforce the engagement of the first body components 21D, 21E, the second body component 22B, and the third body component 23B.

Figure 5A:
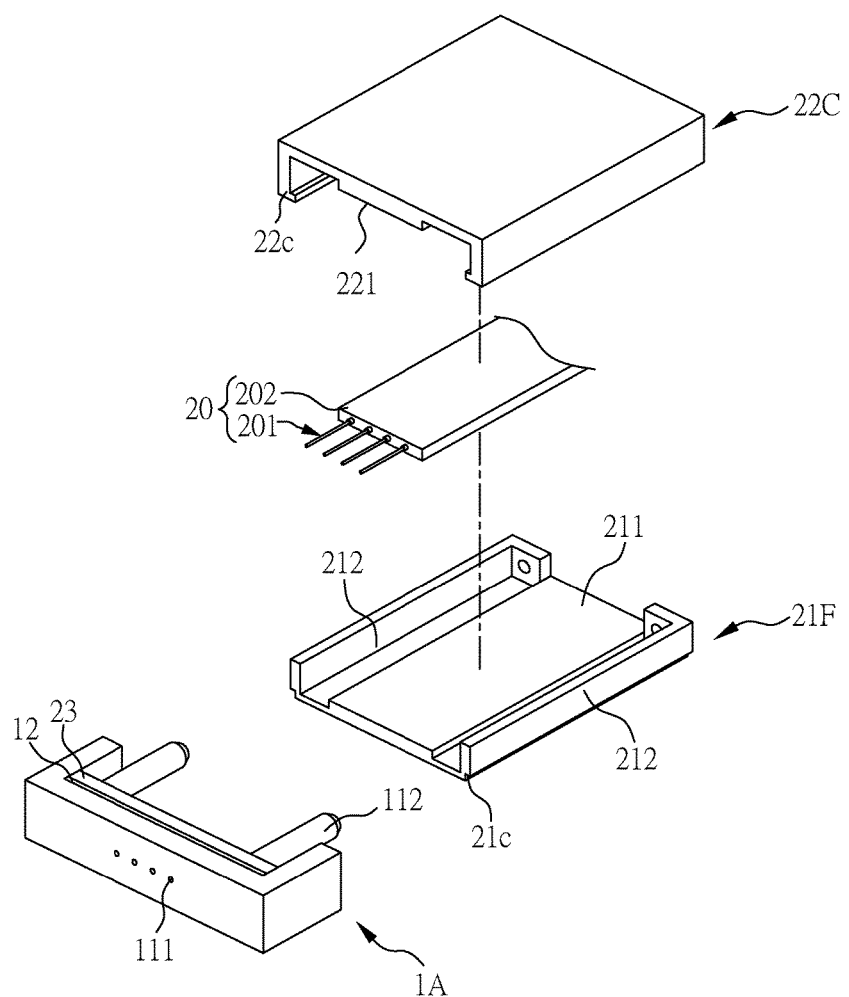
FIG. 5A is an exploded schematic view illustrating a tenth embodiment of the ferrule for optical fiber connector, together with its positioning mold, according to the present invention.
Figure 5B:
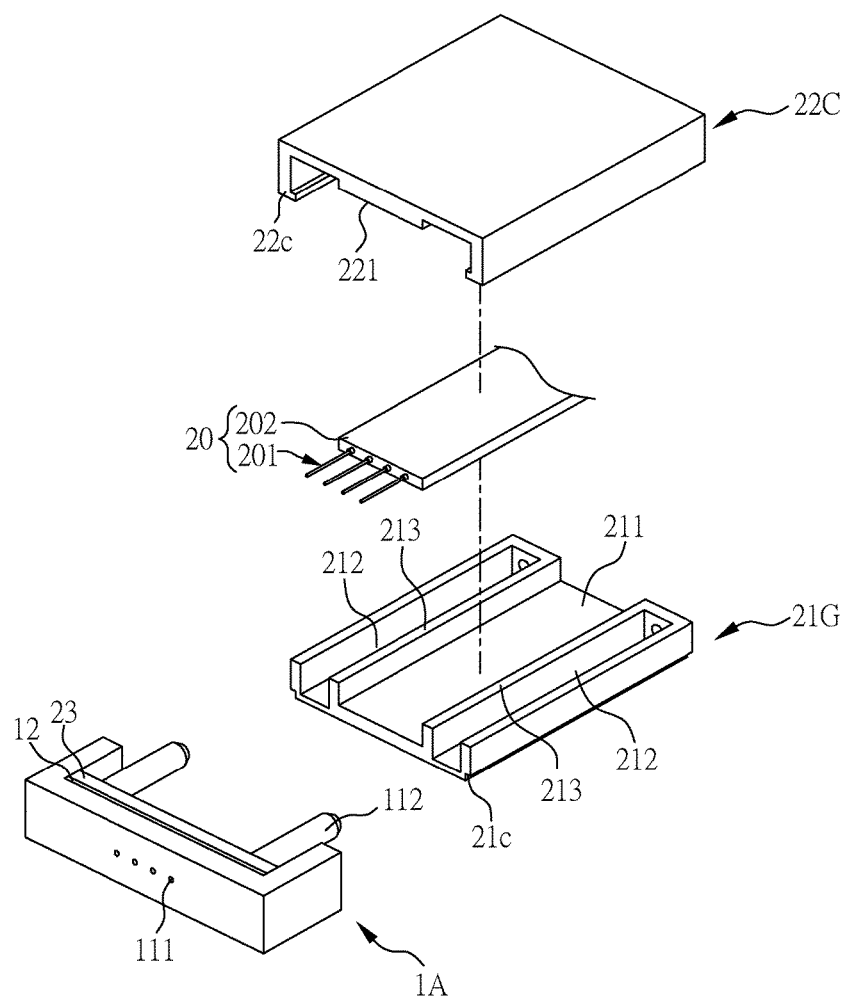
FIG. 5B is an exploded schematic view illustrating an eleventh embodiment of the ferrule for optical fiber connector, together with its positioning mold, according to the present invention.

Still further, references are made to FIG. 5A, an exploded schematic view illustrating a tenth embodiment of the ferrule for optical fiber connector, together with its positioning mold, according to the present invention; FIG. 5B, an exploded schematic view illustrating an eleventh embodiment of the ferrule for optical fiber connector, together with its positioning mold, according to the present invention; and FIG. 5C, an exploded schematic view illustrating a twelfth embodiment of the ferrule for optical fiber connector, together with its positioning mold, according to the present invention.

Figure 5C:
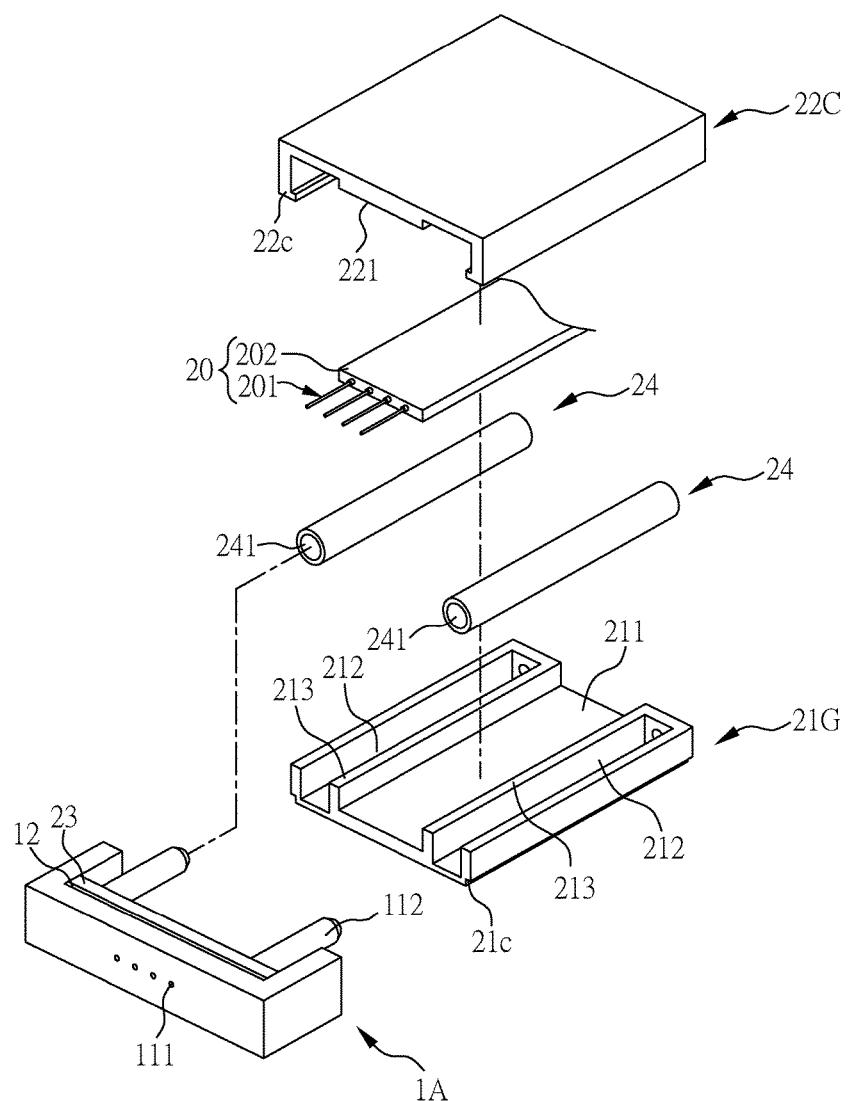
FIG. 5C is an exploded schematic view illustrating a twelfth embodiment of the ferrule for optical fiber connector, together with its positioning mold, according to the present invention.

In view of the fact that FIG. 5A to FIG. 5C correspond to FIG. 2A to FIG. 2C, respectively, descriptions to similar structures therebetween will be omitted, whereas only different structures for FIG. 5A to FIG. 5C versus FIG. 2A to FIG. 2C, correspondingly, are described. As shown in FIG. 5A to FIG. 5C, first body components 21F, 21G each further includes two engaging recesses 21c, and that a second body component 22C further includes two engaging portions 22c corresponding to the two engaging recesses 21c. As a result, by adhering, with adhesive, the first body components 21F, 21G, the second body component 22C, and the third body component 23 together as a unit, the two engaging recesses 21c and the two engaging portions 22c are engaged with each other and reinforce the engagement of the first body components 21F, 21G and the second body component 22C.

Figure 6A:
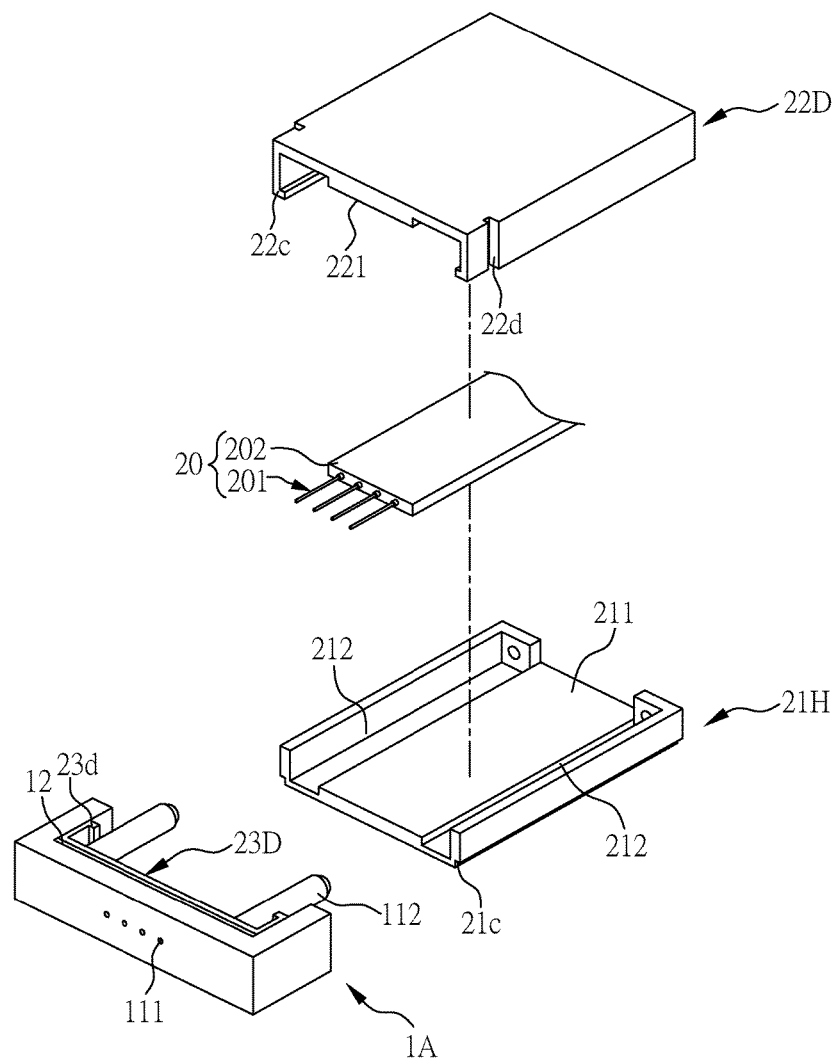
FIG. 6A is an exploded schematic view illustrating a thirteenth embodiment of the ferrule for optical fiber connector, together with its positioning mold, according to the present invention.
Figure 6B:
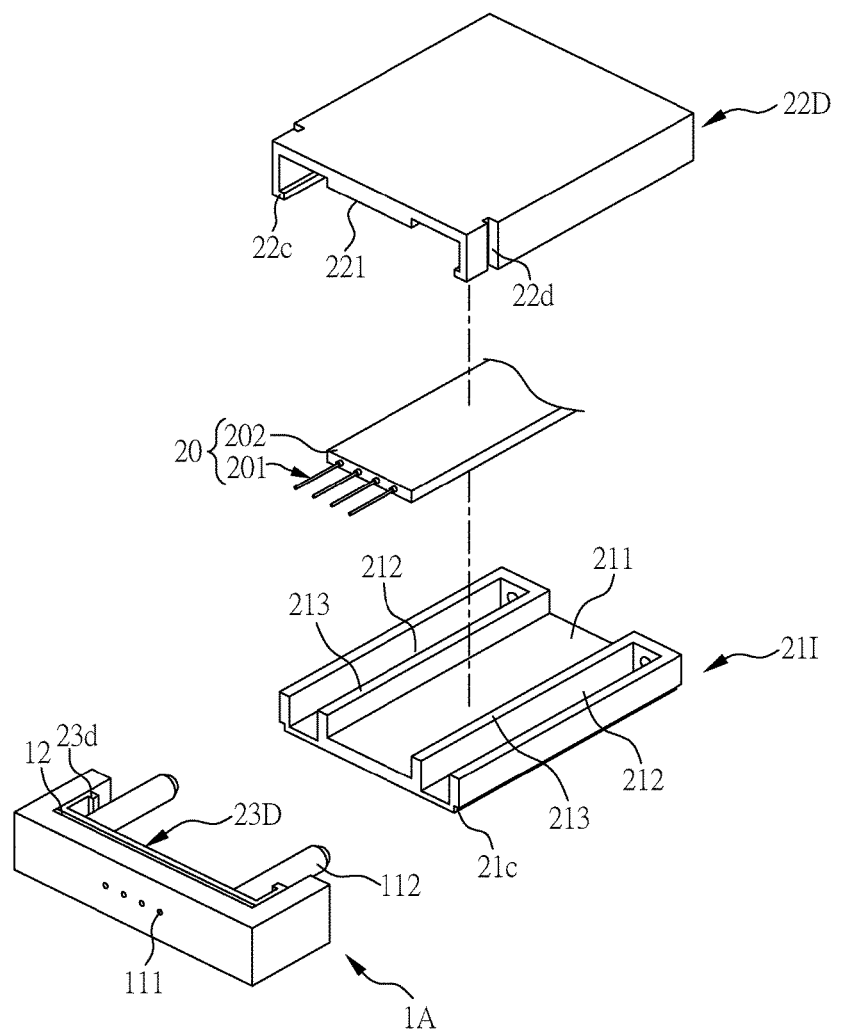
FIG. 6B is an exploded schematic view illustrating a fourteenth embodiment of the ferrule for optical fiber connector, together with its positioning mold, according to the present invention.

References are made to FIG. 6A, an exploded schematic view illustrating a thirteenth embodiment of the ferrule for optical fiber connector, together with its positioning mold, according to the present invention; FIG. 6B, an exploded schematic view illustrating a fourteenth embodiment of the ferrule for optical fiber connector, together with its positioning mold, according to the present invention; and FIG. 6C, an exploded schematic view illustrating a fifteenth embodiment of the ferrule for optical fiber connector, together with its positioning mold, according to the present invention.

Figure 6C:
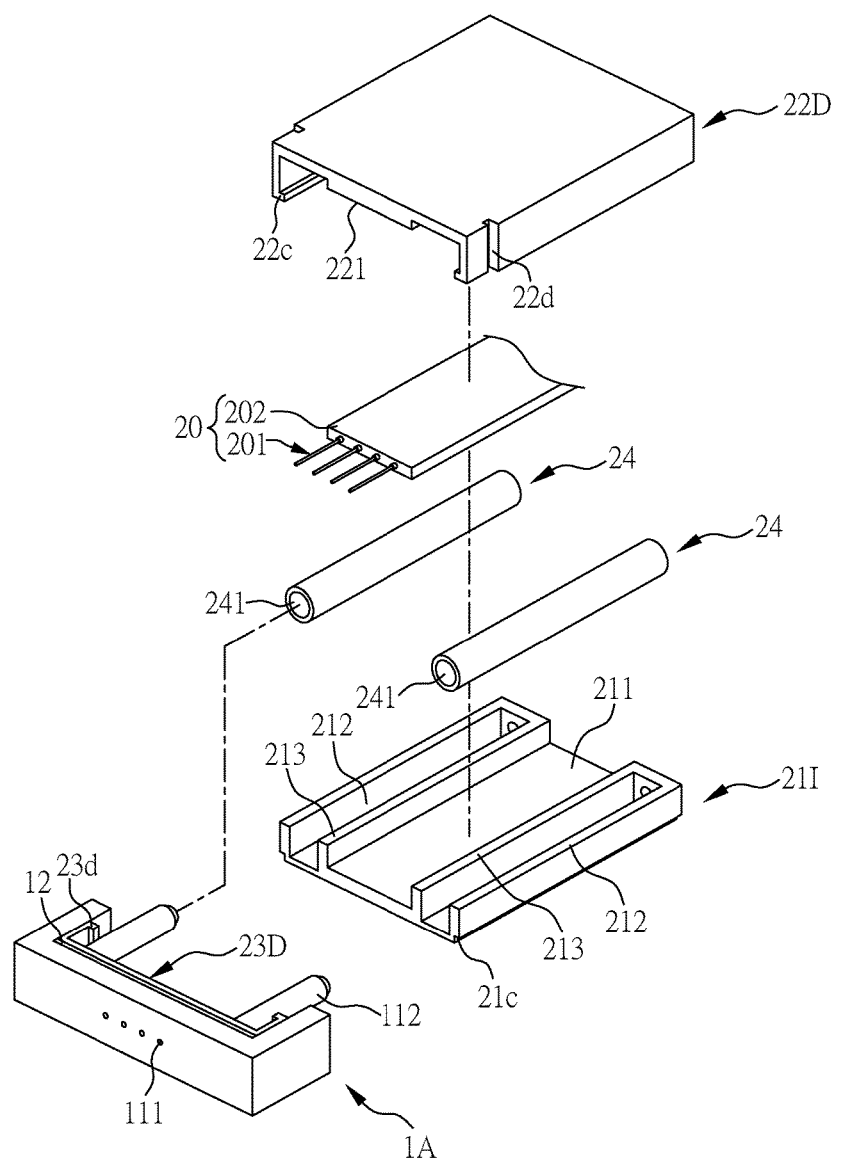
FIG. 6C is an exploded schematic view illustrating a fifteenth embodiment of the ferrule for optical fiber connector, together with its positioning mold, according to the present invention.

In view of the fact that FIG. 6A to FIG. 6C correspond to FIG. 2A to FIG. 2C, respectively, descriptions to similar structures therebetween will be omitted, whereas only different structures for FIG. 6A to FIG. 6C versus FIG. 2A to FIG. 2C, correspondingly, are described. As shown in FIG. 6A to FIG. 6C, first body components 21H, 21I each further includes two engaging recesses 21c; that a second body component 22D further includes two engaging portions 22c corresponding to the two engaging recesses 21c, respectively, and two buckling recesses 22d; and that a third body component 23D further includes two buckling portions 23d corresponding to the two buckling recesses 22d. Therefore, by adhering, with adhesive, the first body components 21H, 21I, the second body component 22D, and the third body component 23D together as a unit, the two engaging recesses 21c and the two engaging portions 22c are engaged with other and such engagement reinforce the engagement of the first body components 21H, 21I and the second body component 22D; and the two buckling recesses 22d and the two buckling portions 23d are engaged with other and such engagement reinforce the engagement of the second body component 22D and the third body component 23D.

Further, in the first embodiment to the fifteenth embodiment of the ferrule for optical fiber connector, together with its positioning mold, according to the present invention, the positioning mold 1A is employed for the positioning purpose. However, the positioning mold 1B, having the two thin plates 12 and the partitioning plate 14, can also be employed to strengthen the positioning effect of the bare fiber 2011.

Figure 7A:
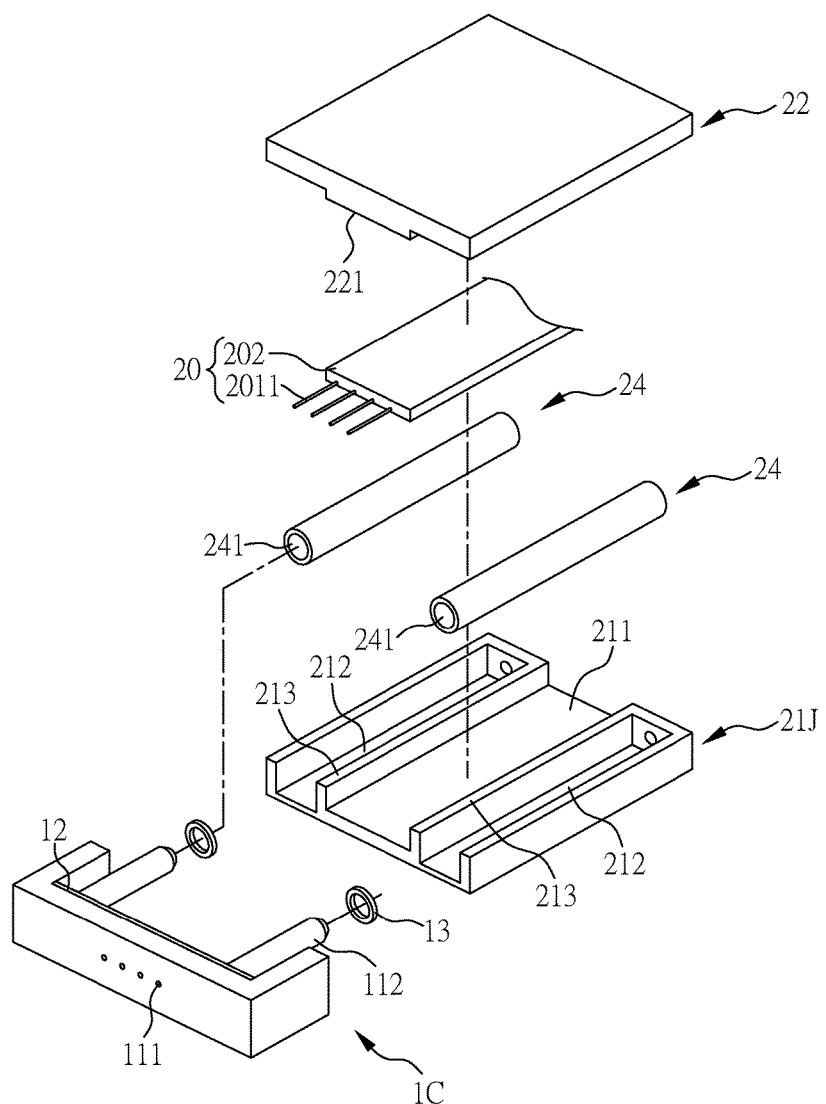
FIG. 7A is an exploded schematic view illustrating a sixteenth embodiment of the ferrule for optical fiber connector, together with its positioning mold, according to the present invention.
Figure 7B:
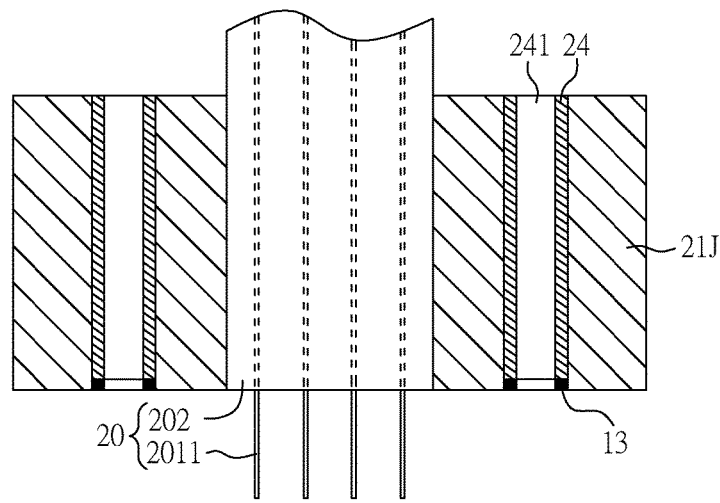
FIG. 7B is a schematic view illustrating an optical fiber connector made by the sixteenth embodiment of the ferrule for optical fiber connector, together with its positioning mold, according to the present invention.

Now references are made to FIG. 7A, an exploded schematic view illustrating a sixteenth embodiment of the ferrule for optical fiber connector, together with its positioning mold, according to the present invention; FIG. 7B, a schematic view illustrating an optical fiber connector made by the sixteenth embodiment of the ferrule for optical fiber connector, together with its positioning mold, according to the present invention; and FIG. 7C, a schematic view illustrating another optical fiber connector made by the sixteenth embodiment of the ferrule for optical fiber connector, together with its positioning mold, according to the present invention.

The ferrule for optical fiber connector, together with its positioning mold, according to the sixteenth embodiment of the present invention, comprises an optical fiber assembly group 20, a first body component 21J, a second body component 22, two tubular components 24, and a positioning mold 1C.

The optical fiber assembly group 20 is interposed in between a first mounting portion 211 and a second mounting portion 221, and includes four bare fibers 2011 and a first protective layer 202. The first body component 21J includes a first mounting portion 211, two accommodation portions, and two mounting boards 213. The two mounting boards 213 are provided for disposing the optical fiber assembly group 20 therebetween; and that the second body component 22 is disposed above the first body component 21J, and includes a second mounting portion 221, where the second mounting portion 221 corresponds to the first mounting portion 211. The two tubular components 24 are received in the two accommodation portions 212, respectively, where the two tubular components 24 each has a third through aperture 241 for receiving a positioning pin 112. In the present embodiment, when in the assembly of the ferrule for optical fiber connector, reserving a mounting space for the optical fiber assembly group 20 is necessary, such that after combining integrally the first body component 21J, the second body component 22, and the two tubular components 24, the optical fiber assembly group 20 is inserted thereinto so as to accomplish an optical fiber connector.

It should be noted that for the positioning mold 1C, there are two measures to arrange the two washers 13. In the first measure, as shown in FIG. 7B for the optical fiber connector, the two washers 13 are adhered integrally together, with adhesive, the first body component 21J, the second body component 22, and the two tubular components 24. Namely, in the first body component 21J, each accommodation portion 212 includes the washer 13 and the tubular component 24, such that the washer 13 can prevent the metallic tubular component 24 from damage during a subsequent grinding process.

Figure 7C:
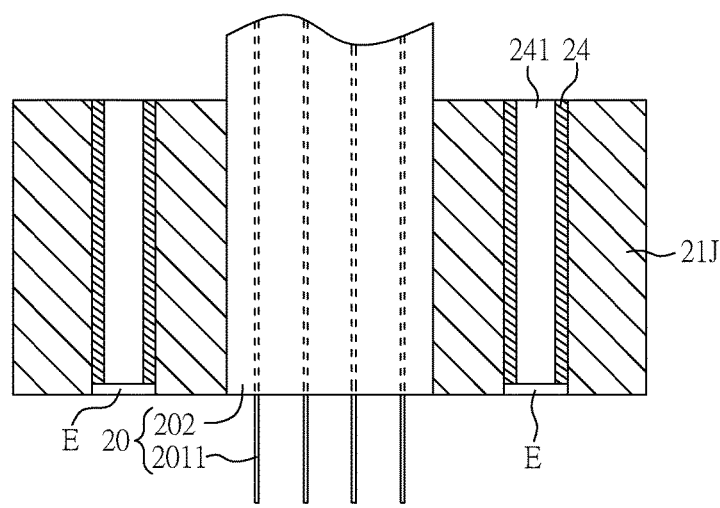
FIG. 7C is a schematic view illustrating another optical fiber connector made by the sixteenth embodiment of the ferrule for optical fiber connector, together with its positioning mold, according to the present invention.

Further, in the second measure for the arrangement of the two washers 13, as shown in FIG. 7C for the optical fiber connector, the two washers 13 are sleeved to the two positioning pins 112, respectively, and are fixedly engaged with the positioning mold 1C. Upon adhering integrally together the first body component 21J, the second body component 22, and the two tubular components 24, the washer 13 can make the accommodation portion 212 of the first body component 21J form a reserved space E. Namely, in the first body component 21J, each accommodation portion 212 includes the tubular component 24 and the reserved space E, such that the reserved space E can prevent the metallic tubular component 24 from damage during a subsequent grinding process.

Still further, after finishing the optical fiber connectors made by the first embodiment to the sixteenth embodiment of the ferrules for optical fiber connectors, together with their positioning molds, a grinding process will be performed. In general, a soft grinding disk is first provided for grinding protruded ends of the optical fiber assemblies 201 (see FIG. 2E), then a layer of hydrophobic material will be coated on the surface on which the soft grinding disk has just ground, and after the coating, a hard grinding disk is provided for grinding the optical fiber assembles 201 for removing the layers of hydrophobic material on ends of the bare fibers 2011 so as to expose the ends of the bare fibers 2011. Finally, the ends of the bare fibers 2011 are sprayed with lens material, such that lenses are formed on the bare fibers 2011 which are then heated for solidification. Such working process is mature and well known to those skilled in the art, and that relevant detailed knowledge can be acquired from public information, so that no redundant description thereto is necessary.

Given the above, it is understood that the ferrule for optical fiber connector, according to the present invention, employs the structures of the first body component 21, the second body component 22, and the third body component 23, as well as the structural modifications thereof. This makes the ferrule for optical fiber connector be able to be assembled more easily through the measures of snap-fit and insertion. In addition, in cooperation with the thin plates 12 and fiber positioning apertures 121 of the positioning molds 1A, 1B, 1C, the positioning effect can be strengthen so as to improve the productivity in manufacturing optical fiber connectors.

Although the present invention has been explained in relation to its preferred embodiments, it is to be understood that many other possible modifications and variations can be made without departing from the scope of the invention as hereinafter claimed.

What is claimed is:

1. A ferrule for optical fiber connector, comprising:
a first body component, including at least one first mounting portion and two accommodation portions;
a second body component, disposed above the first body component, and including at least one second mounting portion, wherein the at least one second mounting portion corresponds to the at least one first mounting portion, respectively; and
a third body component, disposed above the first body component and the second body component, and including at least one positioning through aperture and two second through apertures, wherein the two second through apertures correspond to the two accommodation portions, respectively, the first body component and the second body component are each formed with two recessed portions, and the third body component is formed with two protrusions corresponding to the two recessed portions, respectively;
wherein, the first body component, the second body component, and the third body component are adhered integrally together, with adhesive.

2. The ferrule for optical fiber connector as claimed in claim 1, further comprising two tubular components disposed, respectively, in the two accommodation portions, wherein the two tubular components are adhered integrally together, with adhesive, the first body component, the second body component, and the third body component, and wherein the two tubular components each has a third through aperture corresponding to the second through aperture.

3. The ferrule for optical fiber connector as claimed in claim 1, further comprising an optical fiber assembly group interposed in between the at least one first mounting portion and the at least one second mounting portion.

4. A ferrule for optical fiber connector, comprising:
a first body component, including at least one first mounting portion and two accommodation portions;
a second body component, disposed above the first body component, and including at least one second mounting portion, wherein the at least one second mounting portion corresponds to the at least one first mounting portion, respectively; and
a third body component, disposed above the first body component and the second body component, and including at least one positioning through aperture and two second through apertures, wherein the two second through apertures correspond to the two accommodation portions, respectively, the first body component and the second body component are each formed with two engaging recesses, and the third body component is formed with two engaging portions corresponding to the two engaging recesses, respectively;
wherein, the first body component, the second body component, and the third body component are adhered integrally together, with adhesive.

5. The ferrule for optical fiber connector as claimed in claim 4, further comprising an optical fiber assembly group interposed in between the at least one first mounting portion and the at least one second mounting portion.

6. The ferrule for optical fiber connector as claimed in claim 4, further comprising two tubular components disposed, respectively, in the two accommodation portions, wherein the two tubular components are adhered integrally together, with adhesive, the first body component, the second body component, and the third body component, and wherein the two tubular components each has a third through aperture corresponding to the second through aperture.

7. A ferrule for optical fiber connector, comprising:
a first body component, including at least one first mounting portion and two accommodation portions;
a second body component, disposed above the first body component, and including at least one second mounting portion, wherein the at least one second mounting portion corresponds to the at least one first mounting portion, respectively; and
a third body component, disposed above the first body component and the second body component, and including at least one positioning through aperture and two second through apertures, wherein the two second through apertures correspond to the two accommodation portions, respectively, the first body component further includes two engaging recesses; and the second body component further includes two engaging portions corresponding to the two engaging recesses, respectively, and two buckling recesses; and wherein the third body component further includes two buckling portions corresponding to the two buckling recesses;
wherein, the first body component, the second body component, and the third body component are adhered integrally together, with adhesive.

8. The ferrule for optical fiber connector as claimed in claim 7, further comprising an optical fiber assembly group interposed in between the at least one first mounting portion and the at least one second mounting portion.

9. The ferrule for optical fiber connector as claimed in claim 7, further comprising two tubular components disposed, respectively, in the two accommodation portions, wherein the two tubular components are adhered integrally together, with adhesive, the first body component, the second body component, and the third body component, and wherein the two tubular components each has a third through aperture corresponding to the second through aperture.

10. The ferrule for optical fiber connector as claimed in claim 7, further comprising an optical fiber assembly group interposed in between the at least one first mounting portion and the at least one second mounting portion.

11. A ferrule for optical fiber connector, comprising:
a first body component, including at least one first mounting portion and two accommodation portions;
a second body component, disposed above the first body component, and including at least one second mounting portion, wherein the at least one second mounting portion corresponds to the at least one first mounting portion;
two tubular components, disposed, respectively, in the two accommodation portions, wherein the two tubular components each has a third through aperture for receiving a positioning pin; and
two washers;

wherein, the first body component, the second body component, the two tubular components and the two washers are adhered integrally together, with adhesive.

12. The ferrule for optical fiber connector as claimed in claim 11, further comprising an optical fiber assembly group interposed in between the at least one first mounting portion and the at least one second mounting portion.

13. A positioning mold of ferrule for optical fiber connector, for making the ferrule for optical fiber connector as claimed claim 1, and the positioning mold comprising:
   a lower mold board, including at least one through aperture and two positioning pins; and
   at least one thin plate, disposed above the lower mold board, and each including at least one fiber positioning aperture and two first pin holes, wherein the at least one fiber positioning aperture corresponds to the at least one through aperture, and wherein the two first pin holes correspond to the two positioning pins, respectively, and the at least one thin plate is fixedly engaged with the lower mold board; and
   two washers, sleeved to the two positioning pins, and located above the at least one thin plate.

14. The positioning mold of ferrule for optical fiber connector as claimed in claim 13, further comprising a partitioning plate, wherein the at least one thin plate relates to two thin plates, such that the partitioning plate is interposed in between the two thin plates.

* * * * *